United States Patent
Suzuki

(10) Patent No.: US 8,983,515 B2
(45) Date of Patent: Mar. 17, 2015

(54) WIRELESS COMMUNICATION SYSTEM, WIRELESS COMMUNICATION TERMINAL AND METHOD OF WIRELESS COMMUNICATION

(75) Inventor: Takahito Suzuki, Zushi (JP)

(73) Assignee: Fujitsu Limited, Kawasaki (JP)

(*) Notice: Subject to any disclaimer, the term of this patent is extended or adjusted under 35 U.S.C. 154(b) by 294 days.

(21) Appl. No.: 13/489,133

(22) Filed: Jun. 5, 2012

(65) Prior Publication Data

US 2013/0017832 A1 Jan. 17, 2013

(30) Foreign Application Priority Data

Jul. 13, 2011 (JP) ................. 2011-155246

(51) Int. Cl.
*H04B 7/00* (2006.01)
*H04W 36/00* (2009.01)

(52) U.S. Cl.
CPC ...... *H04W 36/0083* (2013.01); *H04W 36/0061* (2013.01); *Y02B 60/50* (2013.01)
USPC ........ 455/513; 455/435.2; 455/525; 455/437; 455/512; 455/434

(58) Field of Classification Search
USPC .................. 455/434–444, 512–515
See application file for complete search history.

(56) References Cited

U.S. PATENT DOCUMENTS

| | | | |
|---|---|---|---|
| 6,014,565 A * | 1/2000 | Bonta | 455/437 |
| 6,360,098 B1 * | 3/2002 | Ganesh et al. | 455/436 |
| 8,358,638 B2 * | 1/2013 | Scherzer et al. | 370/338 |
| 2003/0117996 A1 | 6/2003 | Lim et al. | |
| 2004/0162074 A1 * | 8/2004 | Chen | 455/437 |
| 2005/0037798 A1 * | 2/2005 | Yamashita et al. | 455/525 |
| 2009/0111470 A1 * | 4/2009 | Thakare | 455/436 |
| 2009/0117905 A1 | 5/2009 | Watanabe et al. | |
| 2010/0216469 A1 * | 8/2010 | Yi et al. | 455/435.3 |
| 2012/0015653 A1 * | 1/2012 | Paliwal et al. | 455/435.1 |

FOREIGN PATENT DOCUMENTS

| | | |
|---|---|---|
| JP | 2004-120080 A | 4/2004 |
| JP | 2005-505983 A | 2/2005 |
| JP | 2007-228242 A | 9/2007 |
| JP | 2009-200634 A | 9/2009 |
| JP | 2009-253357 A | 10/2009 |
| JP | 2010-021890 A | 1/2010 |
| WO | 2008/001452 A1 | 1/2008 |

OTHER PUBLICATIONS

Office Action of Japanese Patent Application No. 2011-155246 dated Jan. 20, 2015 with Partial Translation.

* cited by examiner

*Primary Examiner* — Sharad Rampuria
(74) *Attorney, Agent, or Firm* — Maschoff Brennan

(57) ABSTRACT

A wireless communication system includes: a transmitter to transmit information about cells neighboring to a cell in which a wireless communication terminal exists; a receiver to receive the information about the neighboring cells; a first managing unit to manage a count of not being selected as a transition destination cell for each of the neighboring cells; and a second managing unit to manage a rank of each of the neighboring cells as a transition destination candidate cell based on the count of each of the neighboring cells, the second managing unit selecting the transition destination cell based on the rank.

13 Claims, 14 Drawing Sheets

FIG. 6

| B2 | |
|---|---|
| A1 | 2 |
| A2 | 3 |
| A3 | 1 |
| B1 | 3 |
| B3 | 1 |
| C1 | 3 |
| C2 | 2 |
| C3 | 2 |

| B3 | |
|---|---|
| A2 | 2 |
| A3 | 2 |
| A4 | 3 |
| B2 | 1 |
| B4 | 3 |
| C2 | 1 |
| C3 | 3 |
| C4 | 3 |

| C3 | |
|---|---|
| B2 | 4 |
| B3 | 5 |
| B4 | 9 |
| C2 | 9 |
| C4 | 3 |
| D2 | 2 |
| D3 | 0 |
| D4 | 9 |

(table labeled 33)

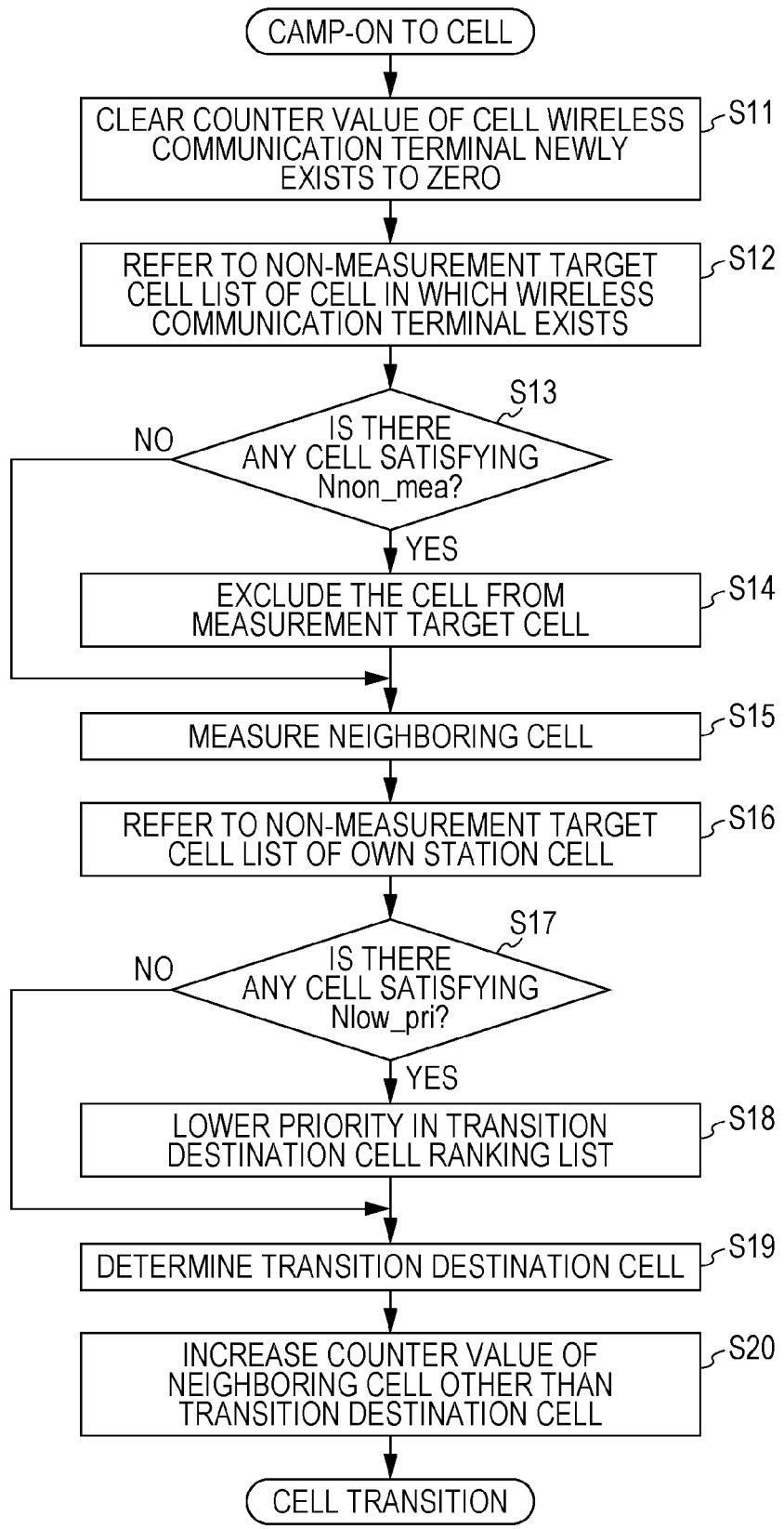

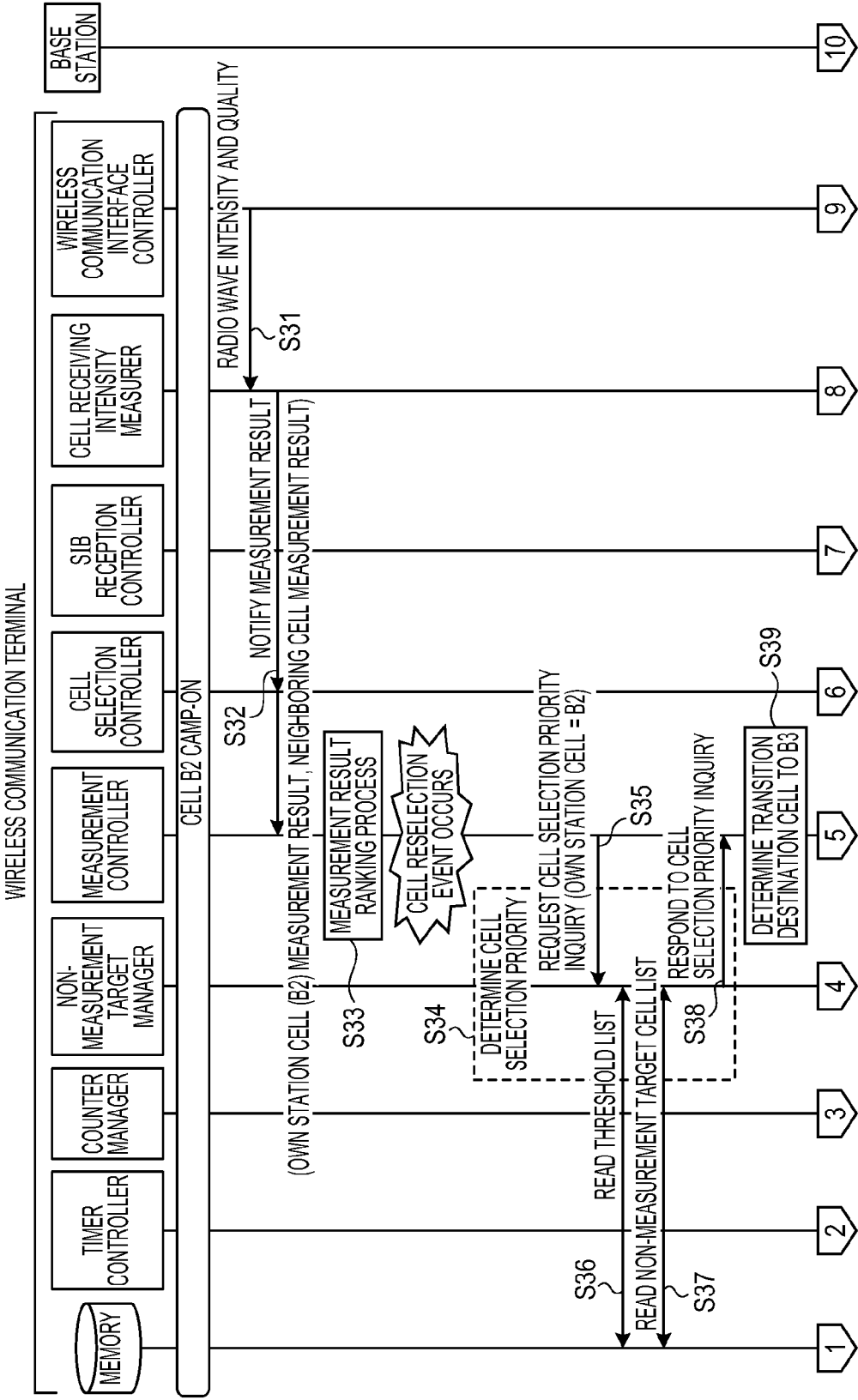

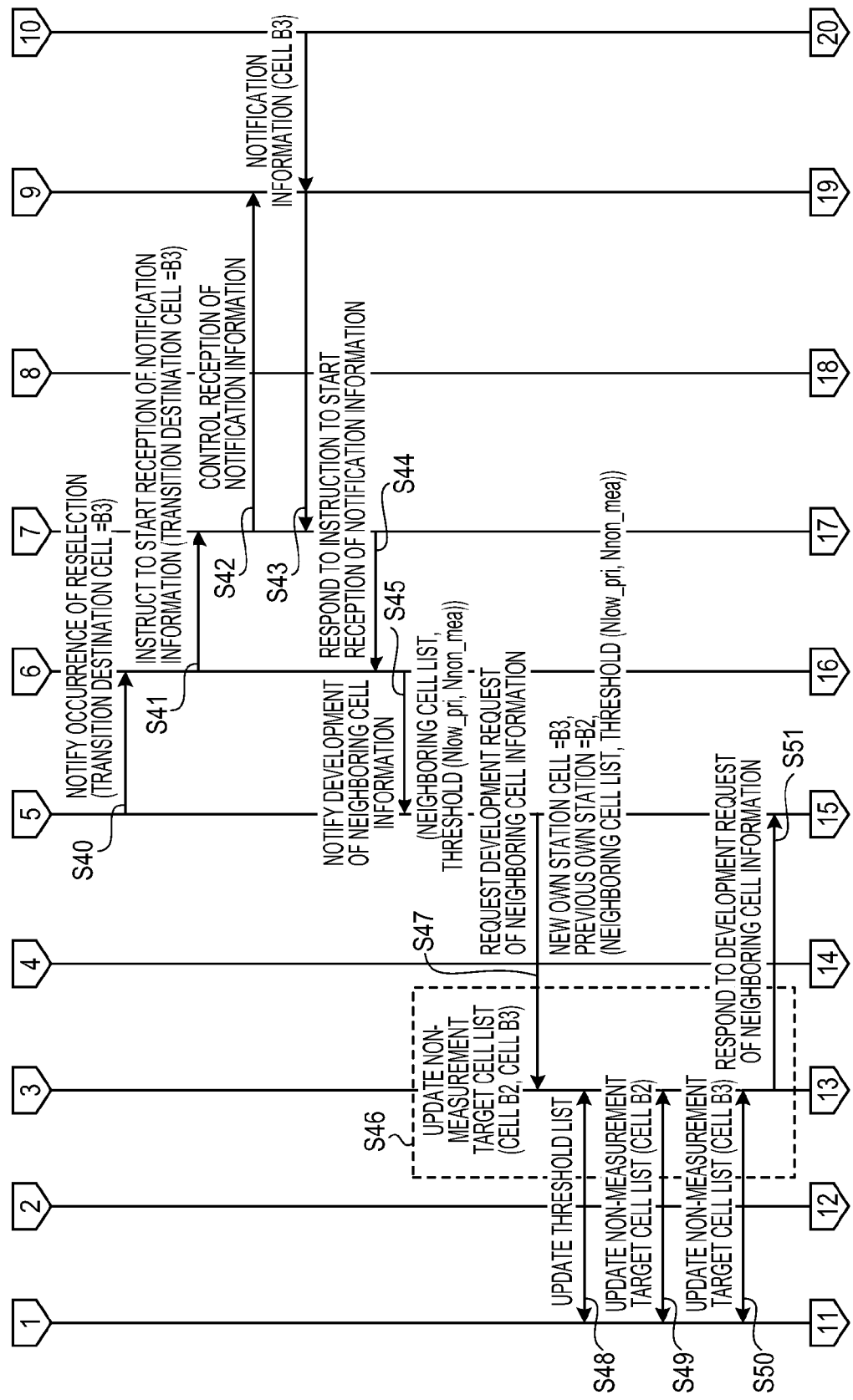

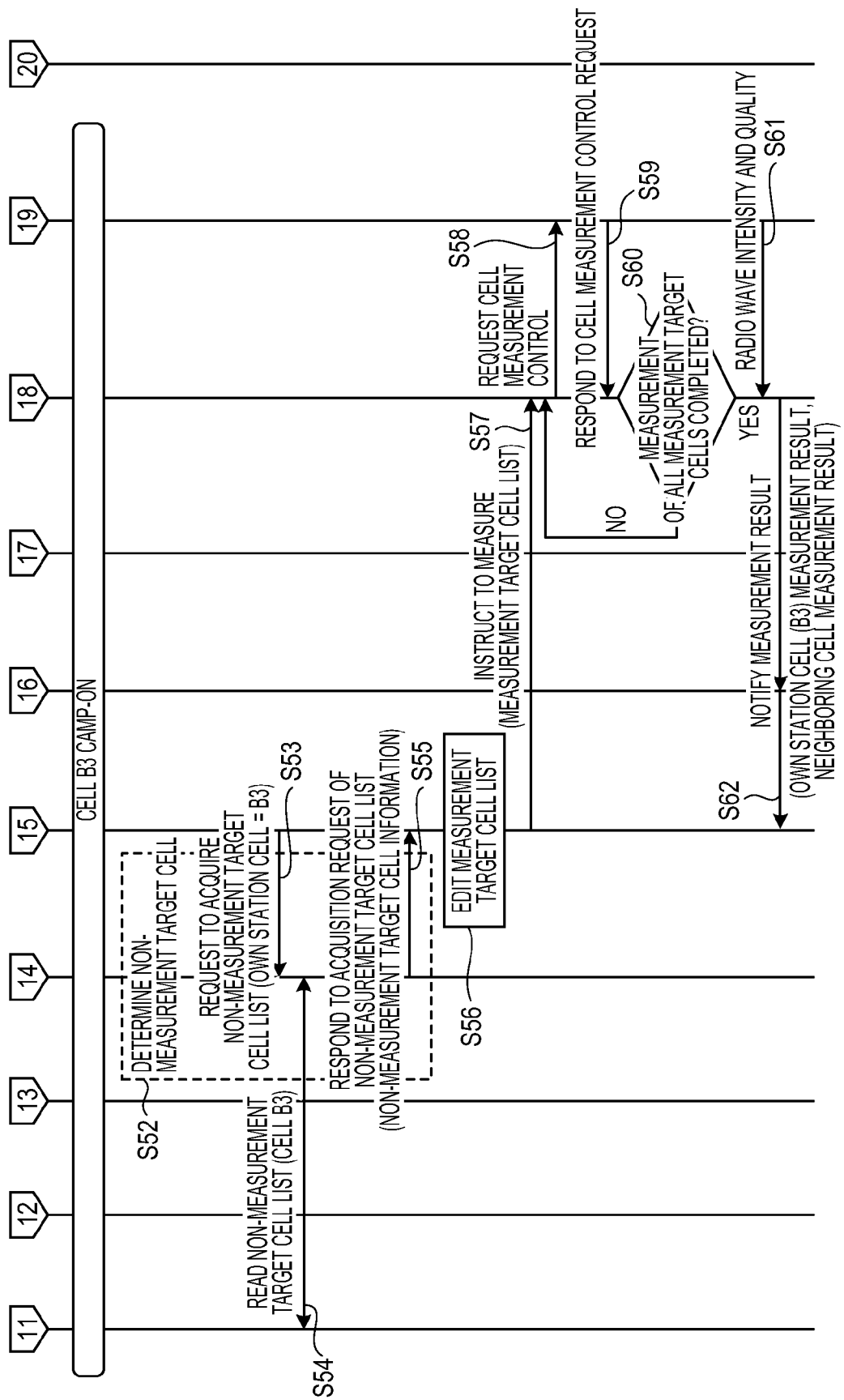

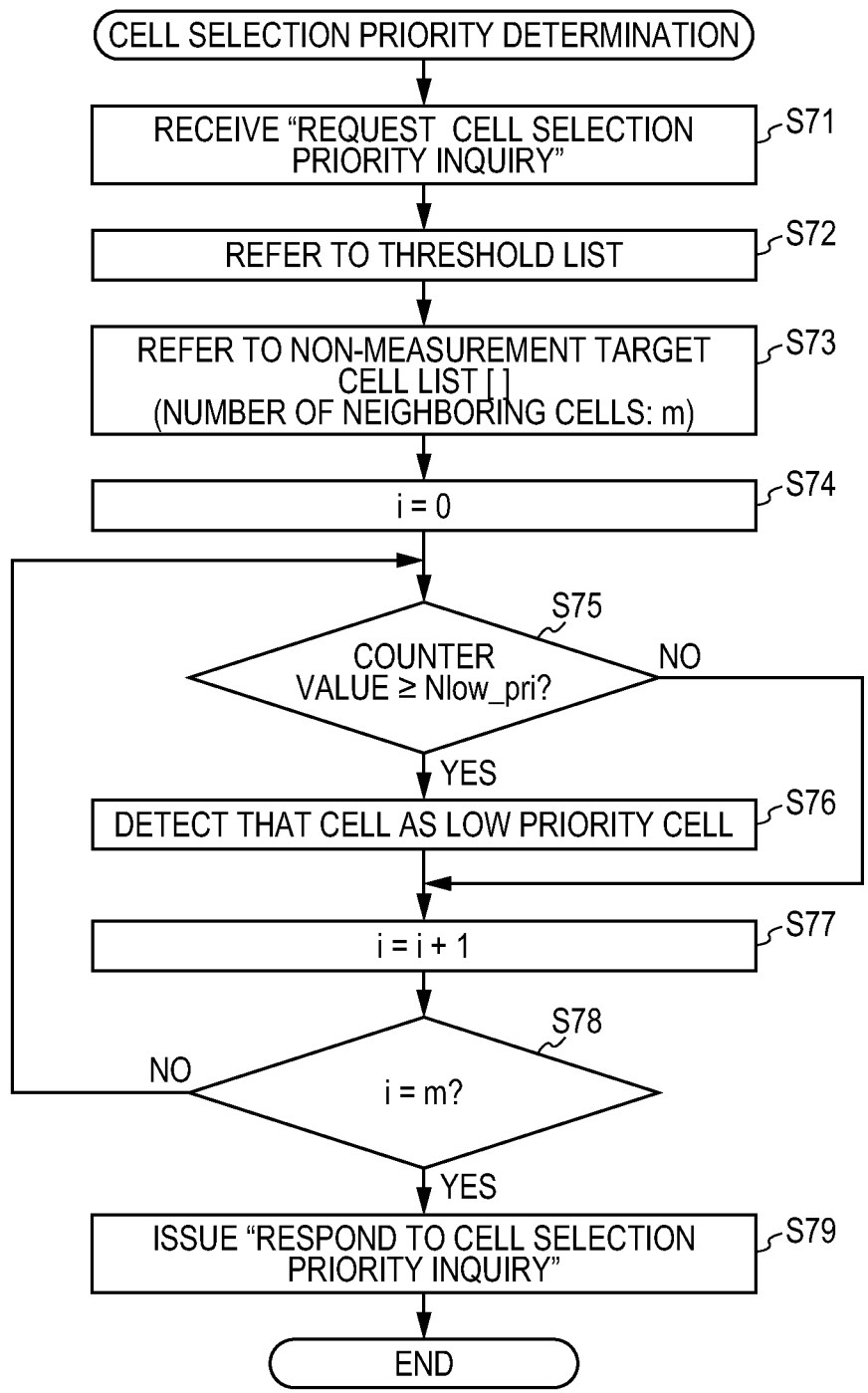

WIRELESS COMMUNICATION SYSTEM, WIRELESS COMMUNICATION TERMINAL AND METHOD OF WIRELESS COMMUNICATION

CROSS-REFERENCE TO RELATED APPLICATION

This application is based upon and claims the benefit of priority of the prior Japanese Patent Application No. 2011-155246, filed on Jul. 13, 2011 the entire contents of which are incorporated herein by reference.

FIELD

The embodiments discussed herein are related to a wireless communication system, a wireless communication terminal and a method of wireless communication

BACKGROUND

Regarding a handover technique in a wireless communication system, a related art base station determines whether a handover to a cell related to a best quality cell report received from a wireless communication terminal is carried out, and transmits information about a neighboring cell which is not capable of accepting the handover to a mobile station. Regarding a cell search technique of a wireless communication terminal, there are a related art method of searching for the neighboring cell with signal strength greater than a reference value by measuring signal strength of neighboring cells, and another related art method of searching for a cell which is one of candidate cells corresponding to information about a current position of the wireless communication terminal traveling an existing moving path. Regarding a cell selection technique of a wireless communication terminal, there is a related art method of selecting a transition destination cell upon comparison, with a threshold, of the number of times of cell reselection events within a predetermined time period or a period of time until the number of times of cell reselection events reaches a certain value.

Examples of related art are discussed in International Publication Pamphlet No. 2008/001452 and Japanese Laid-open Patent Publication Nos. 2009-200634, 2005-505983 and 2007-228242.

SUMMARY

According to an aspect of the invention, wireless communication system includes a transmitter to transmit information about cells neighboring to a cell in which a wireless communication terminal exists; a receiver to receive the information about the neighboring cells; a first managing unit to manage a count of not being selected as a transition destination cell for each of the neighboring cells; and a second managing unit to manage a rank of each of the neighboring cells as a transition destination candidate cell based on the count of each of the neighboring cells, the second managing unit selecting the transition destination cell based on the rank.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an exemplary non-measurement target cell list related to the second embodiment;

FIG. 7 is an exemplary non-measurement target cell list related to the second embodiment;

FIG. 8 is an exemplary non-measurement target cell list related to the second embodiment;

FIG. 9 is a flowchart illustrating an operation of the wireless communication terminal related to the second embodiment;

FIG. 10A is a sequence chart of a procedure for cell transition in a wireless communication system related to the second embodiment;

FIG. 10B is a sequence chart of the procedure for cell transition in the wireless communication system related to the second embodiment;

FIG. 10C is a sequence chart of the procedure for cell transition in the wireless communication system related to the second embodiment;

FIG. 11 is a flowchart illustrating a process for determining priority of cells in wireless communication related to the second embodiment;

DESCRIPTION OF EMBODIMENTS

Figure 1:
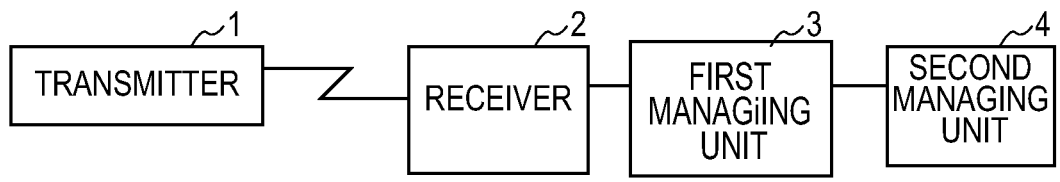
FIG. 1 is a block diagram illustrating a wireless communication system related to a first embodiment.

With reference to the accompanying drawings, preferred embodiments of a wireless communication system, a wireless communication terminal, and a method of wireless communication will be described in detail. In the wireless communication system, the wireless communication terminal, and the method of wireless communication, the wireless communication terminal manages a count, or count data, which is the number of not being selected as a transition destination, about each cell neighboring to a cell in which the wireless communication terminal currently exists; manages a rank, or rank data, as a transition destination candidate in accordance with the count; and selects a transition destination cell in accordance with the rank. In the following description of the embodiments, the same component is denoted by the same reference numeral and duplicated description is omitted.

First Embodiment

Description of Wireless Communication System

FIG. 1 is a block diagram illustrating a wireless communication system related to a first embodiment. As illustrated in FIG. 1, a wireless communication system is provided with a transmitter 1, a receiver 2, a first managing unit 3 and a second managing unit 4. The transmitter 1 is included in wireless communication equipment on a transmitting side. The receiver 2, the first managing unit 3 and the second managing unit 4 are included in a wireless communication terminal on the receiving side.

The transmitter 1 transmits information about cells neighboring to a cell in which a wireless communication terminal currently exists. The receiver 2 receives the information about the neighboring cells transmitted from the transmitter 1. The first managing unit 3 manages a count of not being selected as a transition destination cell about each of the neighboring cells included in the information received by the receiver 2. The second managing unit 4 manages a rank of each of the neighboring cells as a transition destination candidate cell in accordance with the count of not being selected as the transition destination cell, and selects a transition destination cell in accordance with the rank.

Description of Method of Wireless Communication

Figure 2:
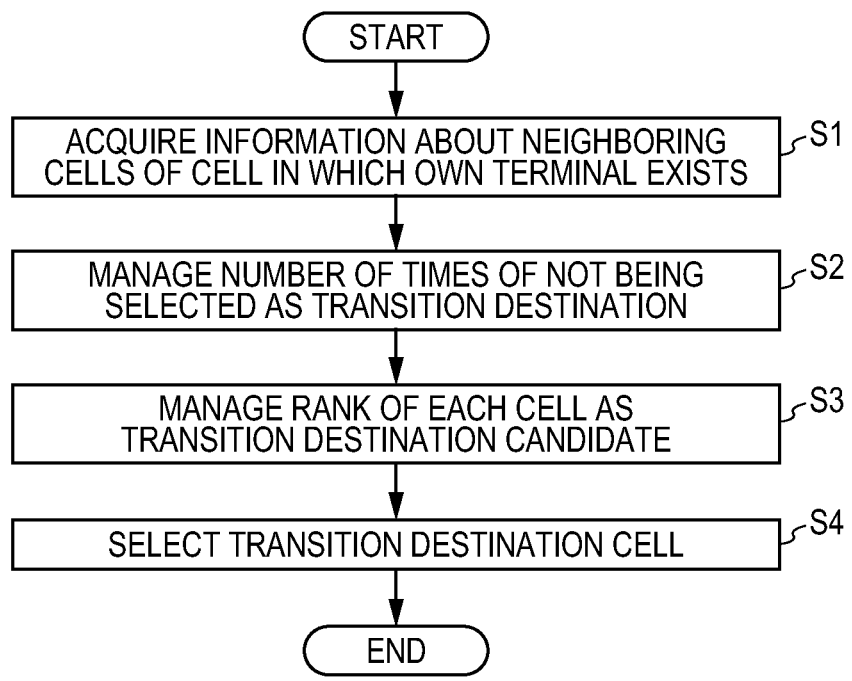
FIG. 2 is a flowchart illustrating a method of wireless communication related to the first embodiment.

FIG. 2 is a flowchart illustrating a method of wireless communication related to the first embodiment. The wireless communication terminal selects a cell ("cell selection") or reselects a cell ("cell reselection") in an idle state or connected state.

As illustrated in FIG. 2, when the cell selection or the cell reselection is started, the wireless communication terminal receives, by the receiver 2, information transmitted from the wireless communication equipment on the transmitting side, and acquires information about cells neighboring to the cell in which the own terminal currently exists (step S1). The information about neighboring cells may include, for example, an identifier of a neighboring base station. Exemplary information about neighboring cells may include a neighbor cell list ("neighbor list") in, for example, the third generation partnership project (3GPP). The wireless communication terminal manages, by the first managing unit 3 thereof, the count of not being selected as a transition destination cell about each of the neighboring cells included in the information (step S2).

The wireless communication terminal manages, by the second managing unit 4 thereof, the rank of each of the neighboring cells as a transition destination candidate cell in accordance with the count of not being selected as a transition destination cell about each of the neighboring cells (step S3). The wireless communication terminal then selects, by the second managing unit 4, a transition destination cell in accordance with the rank of each of the neighboring cells as a transition destination candidate cell (step S4), and completes the series of process steps.

In an example, according to the first embodiment, the wireless communication terminal, in an idle state or during handover, may exclude a cell with a greater count of not being selected as a transition destination cell from the transition destination candidates cells, or may assign lower priority to that cell in selecting a transition destination cell. Therefore, since the measurement of radio wave intensity and communication quality for cells which are less probable to be selected as a transition destination cell may be skipped in the wireless communication terminal, time for cell searching may be shortened and power consumption may be reduced.

Second Embodiment

A second embodiment is a configuration in which the wireless communication system, the wireless communication terminal, and the method of wireless communication according to the first embodiment are applied, for example, to a mobile phone system. In the mobile phone system, an exemplary wireless communication terminal on a receiving side is a mobile phone. Exemplary wireless communication equipment on a transmitting side is a base station.

Description of Hardware Configuration of Wireless Communication Terminal

Figure 3:
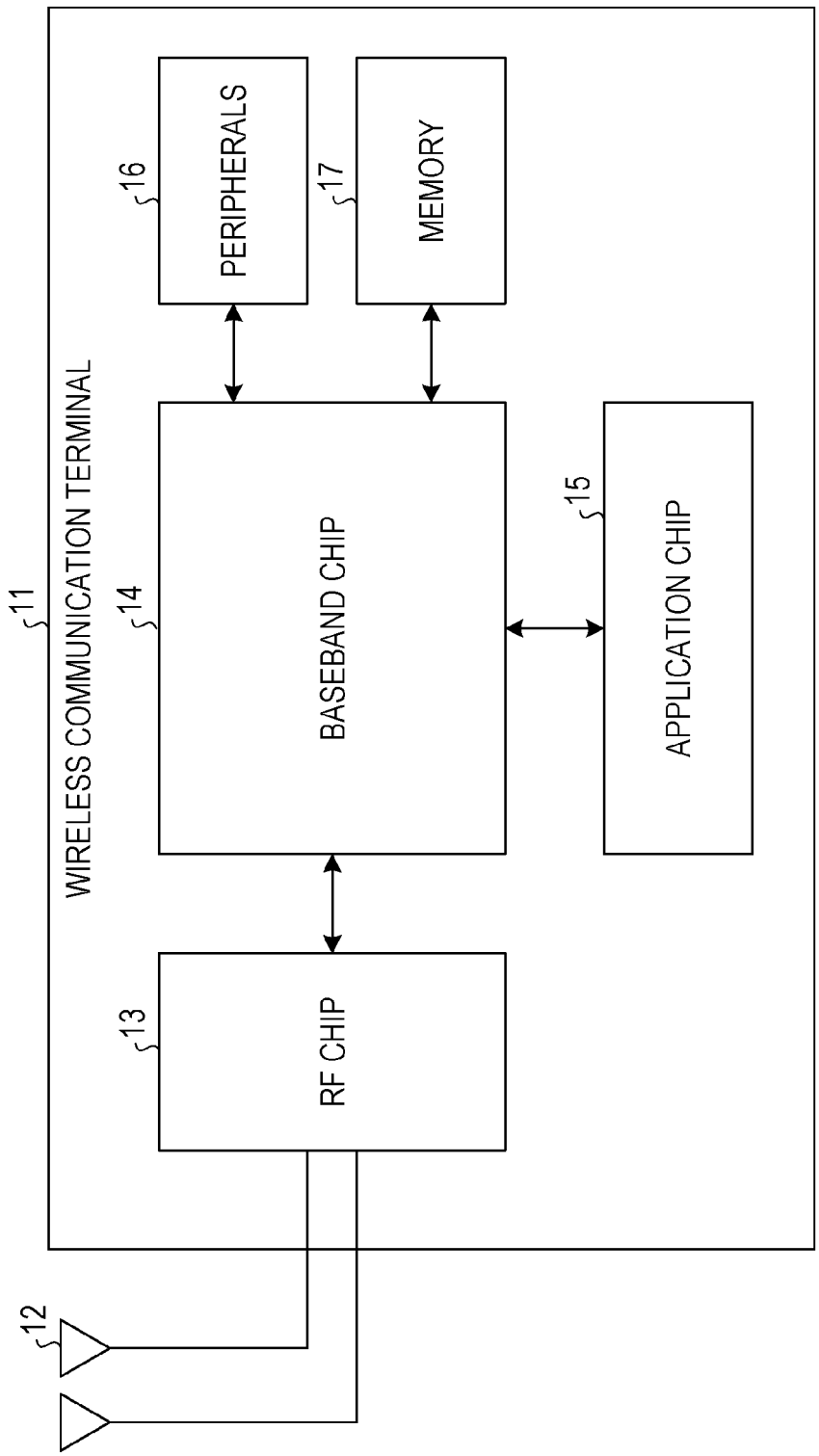
FIG. 3 is a block diagram illustrating a hardware configuration of a wireless communication terminal related to a second embodiment.

FIG. 3 is a block diagram illustrating a hardware configuration of a wireless communication terminal related to a second embodiment. As illustrated in FIG. 3, a wireless communication terminal 11 is provided with an antenna 12, a radio frequency (RF) chip 13 which is an exemplary receiver and carries out a wireless transmission and reception process, a baseband chip 14 which carries out a baseband process, and an application chip 15 which implements an application. Peripherals (i.e., peripheral devices) 16, such as a key for input and a display panel for output, and memory 17 are connected to the baseband chip 14, for example.

Description of Functional Configuration of Wireless Communication Terminal

Figure 4:
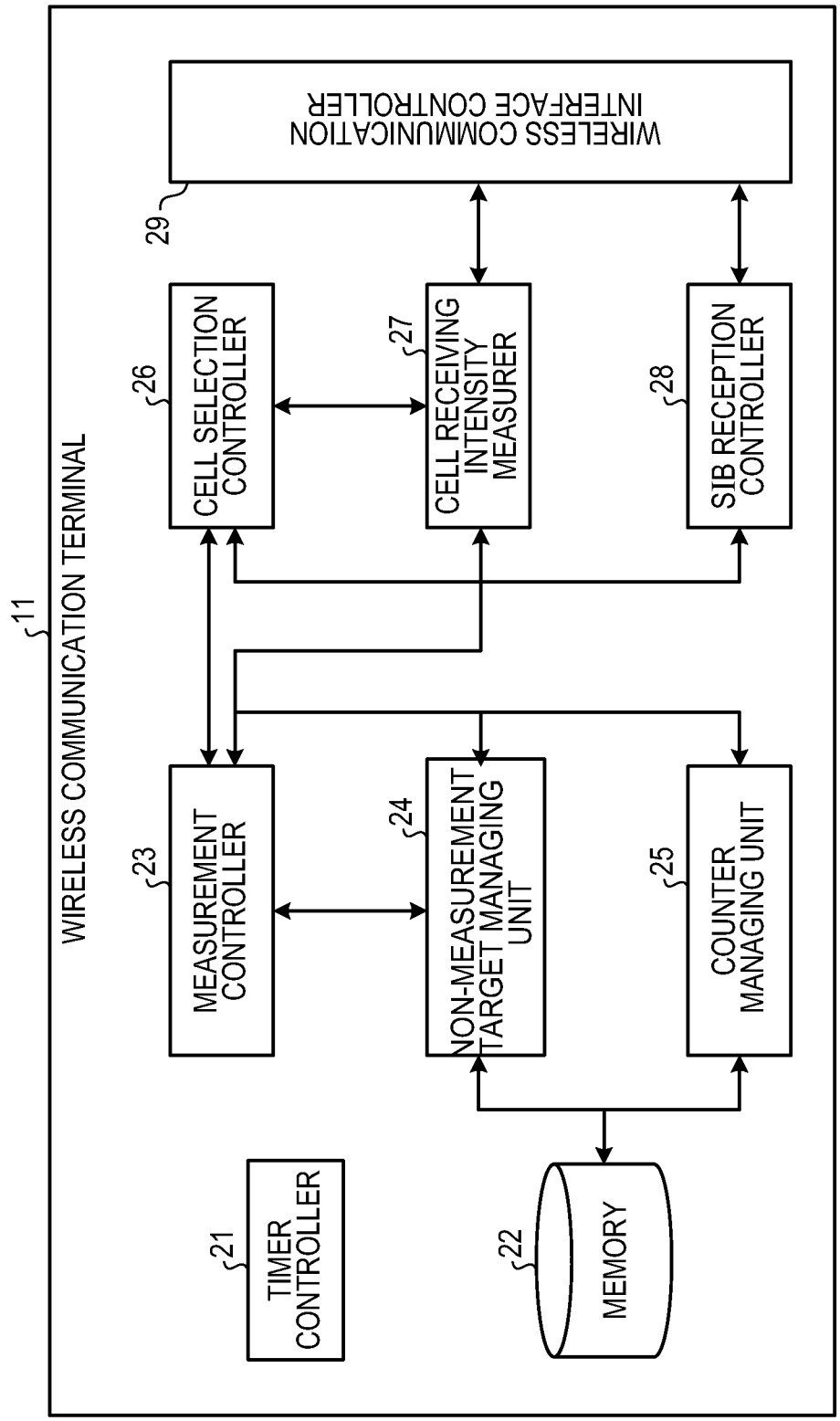
FIG. 4 is a block diagram illustrating a functional configuration of the wireless communication terminal related to the second embodiment.

FIG. 4 is a block diagram illustrating a functional configuration of the wireless communication terminal related to the second embodiment. As illustrated in FIG. 4, the wireless communication terminal 11 is provided with a counter managing unit 25 as an exemplary first managing unit, and a measurement controller 23, and a non-measurement target managing unit 24 as exemplary second managing units. The wireless communication terminal 11 is further provided with a timer controller 21, memory 22, cell selection controller 26, cell receiving intensity measurer 27, system information block (SIB) reception controller 28, and wireless communication interface controller 29.

The measurement controller 23 controls measurement of a wireless communication state, such as radio wave intensity and communication quality, with the neighboring cells. The measurement controller 23 manages the rank of each cell which is a candidate in cell selection or cell reselection in accordance with a measurement result of the wireless communication state. The measurement controller 23 determines whether or not the cell selection or cell reselection is carried out for the cell under management, in accordance with criteria for carrying out the cell selection or cell reselection.

The counter managing unit 25 creates, manages, updates and discards a non-measurement target cell list. After the transition destination cell is determined, the counter managing unit 25 updates and manages the non-measurement target cell list related to the cell in which the own terminal existed before the transition occurs, and the non-measurement target cell list related to the cell in which the own terminal currently exists.

In the non-measurement target cell list, the count of not being selected as a transition destination cell about each cell neighboring to the cell in which the wireless communication terminal 11 currently exists is counted by, for example, a counter. From the non-measurement target cell list, the wireless communication terminal 11 may be informed of the count of not being selected as a transition destination cell about each cell neighboring to the cell in which the own terminal currently exists. The non-measurement target cell list will be described later.

When an event of cell selection or cell reselection occurs in the cell in which the wireless communication terminal 11 currently exists, the non-measurement target managing unit 24 determines, with reference to the non-measurement target cell list related to the cell in which the wireless communication terminal 11 currently exists, to lower priority of the cell which is a transition destination candidate cell or to exclude the cell which is a transition destination candidate cell from the cells of which wireless communication state is to be measured.

The cell selection controller 26 controls the entire camp-on trial procedure regarding a transition destination cell. The camp-on trial procedure includes, for example, acquisition of system information and cell searching in accordance with the system information.

The cell receiving intensity measurer 27 requests the wireless communication interface controller 29 to start and to stop the measurement of the wireless communication state in response to a request from the measurement controller 23. The cell receiving intensity measurer 27 has the same function as, for example, L3 filtering and mobility state determination in the 3GPP.

The SIB reception controller 28 controls the entire acquisition procedure for the system information in response to a request from the cell selection controller 26. The system information includes a counter value Nlow_pri (Number low priority) and Nnon_mea (Number non measurement). The counter value Nlow_pri represents a threshold used in lowering priority in the ranking list of cells which are transition destination candidate cells. The counter value Nnon_mea represents a threshold used in determining that a cell is not a target for which a wireless communication state is measured (non-measurement target). The SIB reception controller 28 informs the threshold Nnon_mea and the threshold Nlow_pri acquired from the system information to the cell selection controller 26.

The memory 22 manages data used in each of functional blocks 23 to 29. A non-measurement target cell list related to each cell is stored in the memory 22. The timer controller 21 provides a timer control function used in each of functional blocks 23 to 29. The wireless communication interface controller 29 controls a wireless communication interface. Each of the functional blocks 23 to 29 illustrated in FIG. 4 may be implemented in the baseband chip 14 by hardware or by a processor which executes software.

Exemplary Non-Measurement Target Cell List

Figure 5:
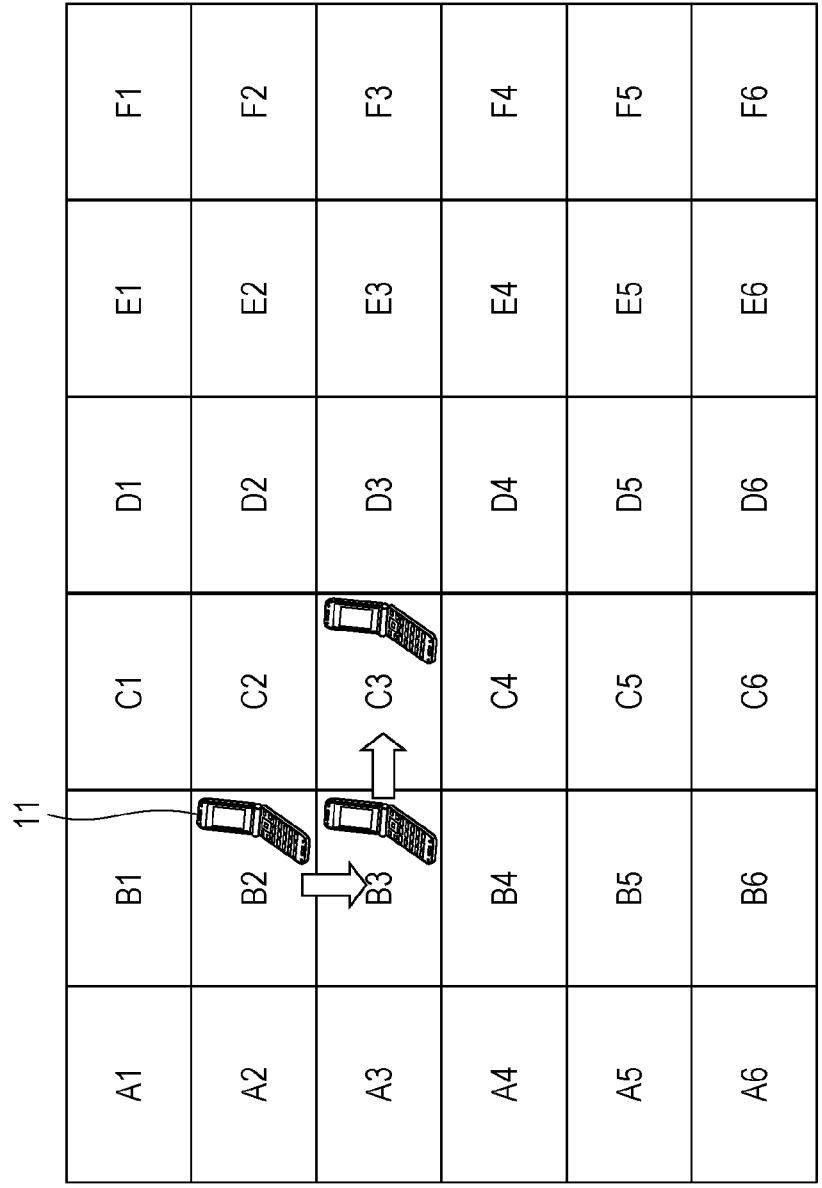
FIG. 5 is a schematic diagram illustrating an exemplary moving path of a wireless communication terminal.

FIG. 5 is a schematic diagram illustrating an example of a moving path of a wireless communication terminal. Suppose that, as illustrated by an arrow in FIG. 5, the wireless communication terminal 11 currently existing in the cell B2 is moved to the cell B3 and then moved to the cell C3.

FIG. 6 is an exemplary non-measurement target cell list in a state in which the wireless communication terminal 11 exists in the cell B2. Cells A1, A2, A3, B1, B3, C1, C2 and C3 neighbor the cell B2. In the example illustrated in FIG. 6, the count that the wireless communication terminal 11 currently existing in B2 has not selected the cell A1 is 2. Similarly, the count of not being selected as a transition destination cell about each of the cells A2, A3, B1, B3, C1, C2 and C3 is 3, 1, 3, 1, 3, 2 and 2, respectively.

If the cell B3 is determined as the transition destination cell, the counter managing unit 25 restores the count of not being selected as a transition destination cell about the cell B3 to the initial value, e.g., zero, in a non-measurement target cell list 31 related to the cell B2. The counter managing unit 25 increases the count of not being selected as a transition destination cell about each of the cells A1, A2, A3, B1, C1, C2 and C3 by, for example, 1 in the non-measurement target cell list 31 related to the cell B2.

FIG. 7 is an exemplary non-measurement target cell list when the wireless communication terminal 11 exists in the cell B3. The cells A2, A3, A4, B2, B4, C2, C3 and C4 neighbor the cell B3. In the example of FIG. 7, the count about these cells of not being selected as a transition destination cell by the wireless communication terminal 11 currently existing in the cell B3 is 2, 2, 3, 1, 3, 1, 3 and 3, respectively. If the cell C3 is determined as a transition destination cell, the counter managing unit 25 restores the count of not being selected as a transition destination cell about the cell C3 to the initial value, and increases the count of each of the rest of the cells in the non-measurement target cell list 32 related to the cell B3.

FIG. 8 is an exemplary non-measurement target cell list when the wireless communication terminal 11 exists in the cell C3. The cells B2, B3, B4, C2, C4, D2, D3 and D4 neighbor the cell C3. In the example of FIG. 8, the count about these cells of not being selected as a transition destination cell by the wireless communication terminal 11 currently existing in the cell C3 is 4, 5, 9, 9, 3, 2, 0 and 9, respectively.

Here, the wireless communication terminal 11 keeps a threshold Nlow_pri and a threshold Nnon_mea. If the threshold Nlow_pri is, for example, 4, the count of not being selected as a transition destination cell about each of the cells B2 and B3 is equal to or greater than the threshold Nlow_pri in the non-measurement target cell list 33 related to the cell C3. Therefore, the non-measurement target managing unit 24 lowers priority of the cells of B2 and B3 in the ranking list of the cells which are transition destination candidate cells.

If the threshold Nnon_mea is, for example, 9, the count of not being selected as a transition destination cell about each of the cells B4, C2 and D4 is equal to or greater than the threshold Nnon_mea in, for example, the non-measurement target cell list 33 related to the cell C3. Therefore, the non-measurement target managing unit 24 excludes the cells B4, C2 and D4 from the targets of which wireless communication state is to be measured. In the example of FIG. 8, the wireless communication state of each of the cells B4, C2 and D4 is not measured, and the cells C4, D2 and D3 are preferentially selected as a transition destination cell since priority of the cells B2 and B3 in selection as a transition destination cell has been lowered.

The threshold Nlow_pri and the threshold Nnon_mea are peculiar to the cell unit in accordance with cell design or the number of neighboring cells. The threshold Nlow_pri and the threshold Nnon_mea are broadcast as system information from the base station to each wireless communication terminal 11. The non-measurement target cell list related to each cell is updated whenever that cell becomes a cell in which the wireless communication terminal 11 exists, and the count of not being selected about the cells neighboring to that cell is increased continuously. The transition destination cell may include a cell into which the wireless communication terminal 11 enters in its idle state and may include a cell into which the wireless communication terminal 11 enters by the handover.

If the non-measurement target cell list related to the cell in which the wireless communication terminal 11 existed has not been created, the counter managing unit 25 creates a new non-measurement target cell list related to the cell. In the created new non-measurement target cell list, the count of not being selected about all the cells neighboring that cell is restored to the initial value.

When the wireless communication terminal 11 is moved out of the coverage area, the counter managing unit 25 may restore the count of not being selected as a transition destination cell about all the cells neighboring that cell to the initial value in the non-measurement target cell list related to the cell in which the wireless communication terminal 11 has most recently existed. In the example of FIG. 5, when the wireless communication terminal 11 existing in the cell C3 is moved out of the coverage area, the count of not being selected about each of the cells B2, B3, B4, C2, C4, D2, D3 and D4 may be restored to the initial value in the non-measurement target cell list illustrated in FIG. 8.

The most recently updated time stamp may be managed in the non-measurement target cell list related to each cell by the timer controller 21 for each non-measurement target cell list. The counter managing unit 25 may discard non-measurement target cell lists that have not been updated for a certain period of time. If the wireless communication terminal 11 re-enters a cell until the non-measurement target cell list related to that cell is discarded, the non-measurement target cell list currently kept will be reused.

Operation of Wireless Communication Terminal after Camp-On to One Cell until Transition to Another FIG. 9 is a flowchart illustrating an operation of the wireless communication terminal related to the second embodiment. As illustrated in FIG. 9, after camping-on to a certain cell, the wireless communication terminal 11 restores the count (i.e., the counter value) of not being selected as a transition destination cell about the cell in which the wireless communication terminal 11 newly exists to the initial value, e.g., zero in the non-measurement target cell list related to that cell (step S11).

The wireless communication terminal 11 then refers to the non-measurement target cell list related to the cell in which the wireless communication terminal 11 newly exists (step S12). If there is any cell which satisfies the threshold Nnon_mea in the referred non-measurement target cell list (step S13: Yes), the wireless communication terminal 11 excludes the cell which satisfies the threshold Nnon_mea from the target of which wireless communication state is to be measured (step S14).

In the cell which satisfies the threshold Nnon_mea, the count of not being selected as a transition destination cell is equal to or greater than the threshold Nnon_mea. If there is no cell which satisfies the threshold Nnon_mea in the non-measurement target cell list, (step S13: No), step S14 is skipped. The wireless communication terminal 11 then measures a wireless communication state of a neighboring cell which is a measurement target cell (step S15).

Subsequently, wireless communication terminal 11 refers to the non-measurement target cell list related to an own station cell (i.e., a serving cell) (step S16). If there is a cell which satisfies the threshold Nlow_pri in the referred non-measurement target cell list (step S17: Yes), the wireless communication terminal 11 lowers priority of the cell which satisfies the threshold Nlow_pri in the ranking list of the cells which are transition destination candidate cells (step S18).

Regarding the cell which satisfies the threshold Nlow_pri, the count of not being selected as a transition destination cell is equal to or greater than the threshold Nlow_pri. If there is no cell which satisfies the threshold Nlow_pri in the non-measurement target cell list (step S17: No), step S18 is skipped. The wireless communication terminal 11 then determines a transition destination cell in accordance with the ranking list of the cells which are the transition destination candidate cells (step S19). The wireless communication terminal 11 increases the count (i.e., the counter value) of not being selected about neighboring cells other than the cell determined as the transition destination cell in the non-measurement target cell list related to the own station cell (step S20). The wireless communication terminal 11 is then moved into the cell determined in step S19 as the transition destination cell.

Sequence of Transition to Other Cell

FIG. 10A is a sequence chart of the procedure for cell transition in the wireless communication system related to the second embodiment. FIG. 10B illustrates a sequence continued from FIG. 10A, and FIG. 10C illustrates a sequence continued from FIG. 10B. Here, an example in which the wireless communication terminal 11 camps on to the cell B2 and then moves into the cell B3 will be described.

As illustrated in FIG. 10A, after the wireless communication terminal 11 camped on to the cell B2, the wireless communication interface controller 29 measures the wireless communication state, and notifies the cell receiving intensity measurer 27 of, for example, radio wave intensity and communication quality (step S31). The cell receiving intensity measurer 27 notifies the cell selection controller 26 and the measurement controller 23 of the measurement result of the own station cell B2 and the measurement result of the cells neighboring to the own station cell B2 (step S32).

The measurement controller 23 carries out a measurement result ranking process in accordance with the measurement result of the own station cell B2 and the measurement result of the cells neighboring to the own station cell B2 (step S33). With the measurement result ranking process, the cells which are the transition destination candidate cells are ranked in descending order of, for example, the radio wave intensity or the communication quality and are managed. Examples of the measurement result ranking process may include a process of control content conforming to, for example, 3GPP (36.304 (Long Term Evolution: LTE)) and 25.304 (Universal Mobile Telecommunications System: UMTS).

Subsequently, the measurement controller 23 determines, in accordance with the determination content conforming to, for example, 3GPP, a decrease in radio wave intensity and reduction in communication quality of the own station cell B2, and an improvement in radio wave intensity and communication quality of the cells neighboring to the own station cell B2, and then determines whether cell reselection is started. Here, a case in which it is determined to start cell reselection will be described. That is, a cell reselection event occurs.

Subsequently, the measurement controller 23 issues, to the non-measurement target managing unit 24, an inquiry request regarding priority in cell selection about the own station cell B2 and inquires whether the cells neighboring to the own station cell B2 satisfies conditions under which priority is lowered (step S35). When the inquiry request regarding priority in cell selection is received, the non-measurement target managing unit 24 reads a threshold list (the threshold Nlow_pri and the threshold Nnon_mea) and a non-measurement target cell list from the memory 22 (step S36, step S37) and carries out a determination process of priority in cell selection (step S34).

After the determination process of priority in cell selection is completed, the non-measurement target managing unit 24 issues a response to the inquiry request of priority in cell selection, and notifies the measurement controller 23 of the neighboring cell with lower priority (step S38). The determination process of priority in cell selection will be described later.

The measurement controller 23 treats the neighboring cell with low priority notified by the response to the inquiry request of priority in cell selection as the cell with low priority in the ranking of the cells which are the transition destination candidate cells. For example, the measurement controller 23 may shift the notified neighboring cell with low priority to the lowest place in the ranking list under management.

Subsequently, the measurement controller 23 determines the cell with highest priority (i.e., the cell at the highest place) in the ranking list under management as the transition destination cell (step S39) and, as illustrated in FIG. 10B, issues a notification regarding occurrence of reselection to the cell selection controller 26 (step S40). In the example illustrated in FIG. 10A, the transition destination cell is the cell B3.

When the notification regarding occurrence of cell reselection in which the cell B3 is the transition destination cell is received, the cell selection controller 26 instructs the SIB reception controller 28 to start receiving the system information regarding the cell B3 (step S41). When the instruction to start receiving the system information regarding the cell B3 is received, the SIB reception controller 28 carries out reception control of the system information to the wireless communication interface controller 29 (step S42).

The wireless communication interface controller 29 receives the system information broadcast from a base station of the cell B3 and notifies the SIB reception controller 28 of the system information (step S43). The system information of the cell B3 includes a list of the threshold list related to the cell B3 (i.e., the threshold Nlow_pri and the threshold Nnon_mea) and a list of cells neighboring to the cell B3.

When the system information of the cell B3 is received, the SIB reception controller 28 return a response to the instruction to start receiving the system information to the cell selection controller 26 (step S44). When the response to the instruction to start receiving the system information is received, the cell selection controller 26 tries camping-on to the transition destination cell (here, the cell B3).

In the camp-on trial process, the cell selection controller 26 issues a notification regarding development of neighboring cell information to the measurement controller 23 (step S45). The notification regarding development of neighboring cell information includes the threshold (i.e., the threshold Nlow_pri and Nnon_mea) and a list of cells neighboring to the cell B3 acquired from the system information regarding the cell B3.

Subsequently, the measurement controller 23 issues a development request of the neighboring cell information to the counter managing unit 25 (step S47). The development request of the neighboring cell information includes the cell B3 as a new own station cell, the cell B2 as a previous own station cell, a list of cells neighboring to the cell B3, and the threshold (i.e., the threshold Nlow_pri and Nnon_mea) are included in.

When the development request of the neighboring cell information is received, the counter managing unit 25 carries out an updating process of the non-measurement target cell list (step S46). In the updating process of the non-measurement target cell list, the threshold list stored in the memory 22, the non-measurement target cell list related to the previous own station cell B2, and the non-measurement target cell list related to the new own station cell B3 are updated (step S48, step S49, step S50).

After the updating process of the non-measurement target cell list is completed, the counter managing unit 25 issues a response to the development request of the neighboring cell information to the measurement controller 23 (step S51). The updating process of the non-measurement target cell list will be described later.

When the measurement controller 23 receives the response to the development request of the neighboring cell information and the wireless communication terminal 11 camps on to the cell B3, the measurement controller 23 issues an acquisition request of the non-measurement target cell list related to the cell B3 to the non-measurement target managing unit 24 (step S53). When the acquisition request of the non-measurement target cell list related to the cell B3 is received, the non-measurement target managing unit 24 reads the non-measurement target cell list related to the cell B3 from the memory 22 (step S54) and carries out the determination process of the non-measurement target cell (step S52).

After the determination process of the non-measurement target cell is completed, the non-measurement target managing unit 24 issues a response to the acquisition request of the non-measurement target cell list to the measurement controller 23 (step S55). The response to the acquisition request of the non-measurement target cell list includes information about the non-measurement target cell. The information about the non-measurement target cell may include information about a cell which becomes a non-measurement target cell due to restrictions specified in 3GPP or other factors, such as Closed Subscriber Group (CSG). The determination process of the non-measurement target cell will be described later.

When the response to the acquisition request of the non-measurement target cell list is received, the measurement controller 23 determines a neighboring cell for which the wireless communication state is measured in accordance with the information about the non-measurement target cell, and edits the list of the measurement target cells (step S56). The measurement controller 23 instructs the cell receiving intensity measurer 27 to measure the wireless communication state (step S57). The instruction of the wireless communication state includes the list of the measurement target cell.

When the instruction of the wireless communication state is received, the cell receiving intensity measurer 27 requests the wireless communication interface controller 29 to measure the wireless communication state of each cell (step S58), and receives the response to the measurement request of the wireless communication state (step S59). The cell receiving intensity measurer 27 repeats steps S58 to S59 until measurement of the wireless communication state of all the measurement target cells which exist in the list of the measurement target cells is completed (step S60: No).

When measurement of the wireless communication state of all the measurement target cells is completed (step S60: Yes), the wireless communication interface controller 29 notifies the cell receiving intensity measurer 27, for example, the radio wave intensity and the communication quality (step S61). The cell receiving intensity measurer 27 notifies the cell selection controller 26 and the measurement controller 23 of the measurement result of the own station cell B3 and the measurement result of the cells neighboring to the own station cell B3 (step S62). Subsequent steps are the same as those after step S33 except that the cell B3 is the own station cell.

Determination Process of Priority in Cell Selection

FIG. 11 is a flowchart illustrating a process for determining priority of cells in wireless communication related to the second embodiment. In the priority determination process in cell selection as illustrated in FIG. 11, when the inquiry request of priority for cell selection is received (step S71), the non-measurement target managing unit 24 refers to the threshold list stored in the memory 22 (step S72) and reads the threshold Nlow_pri.

The non-measurement target managing unit 24 uses the own station cell input in the inquiry request of priority in cell selection as a key, and refers to the non-measurement target cell list related to the own station cell stored in the memory 22 (step S73). Step S72 and step S73 may be carried out in reverse order. Suppose that the number of neighboring cells included in the non-measurement target cell list is m (m: integer).

The index number i (i: integer) is initialized to, for example, zero (step S74). Step S74 may be carried out before step S73 or before step S72. Subsequently, the non-measurement target managing unit 24 compares the count of not being selected as a transition destination cell (i.e., the counter value) regarding each neighboring cell in the non-measurement target cell list with the threshold Nlow_pri (step S75).

In accordance with the comparison result, the non-measurement target managing unit 24 detects the neighboring cell of which counter value is equal to or greater than the threshold Nlow_pri (step S75: Yes) as a low priority cell (step S76). Regarding the neighboring cell of which counter value is smaller than the threshold Nlow_pri (Step S75: No), step S76 is skipped.

The index number i is incremented (step S77) and the next neighboring cell in the non-measurement target cell list becomes a process target. Steps S75 to S78 are repeated until the index number i becomes equal to the number of the neighboring cells m included in the non-measurement target cell list (step S78: No).

When the index number i becomes equal to the number of the neighboring cells included in the non-measurement target cell list (step S78: Yes), comparison of the count of not being selected as a transition destination cell (i.e., the counter value) regarding all the neighboring cells in the non-measurement target cell list with the threshold Nlow_pri has been completed. Therefore, the non-measurement target managing unit 24 sets all the low priority cells detected in step S76 to the response to the inquiry request of priority in cell selection. Subsequently, the non-measurement target managing unit 24 issues a response to the inquiry request of priority in cell selection (step S79), and completes the series of process steps.

Updating Process of Non-Measurement Target Cell List

Figure 12A:
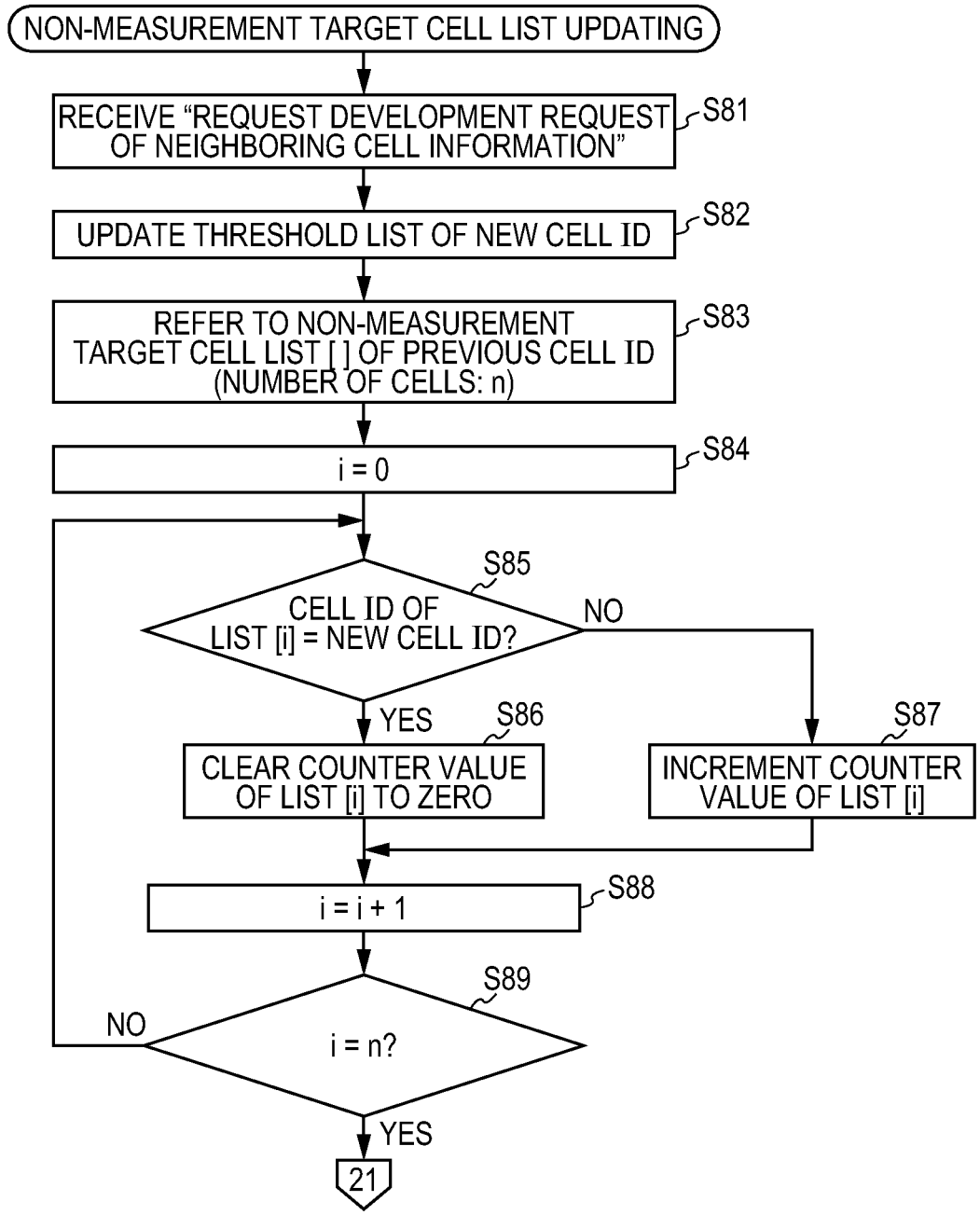
FIG. 12A is a flowchart illustrating a process for updating a non-measurement target cell list in the method of wireless communication related to the second embodiment.
Figure 12B:
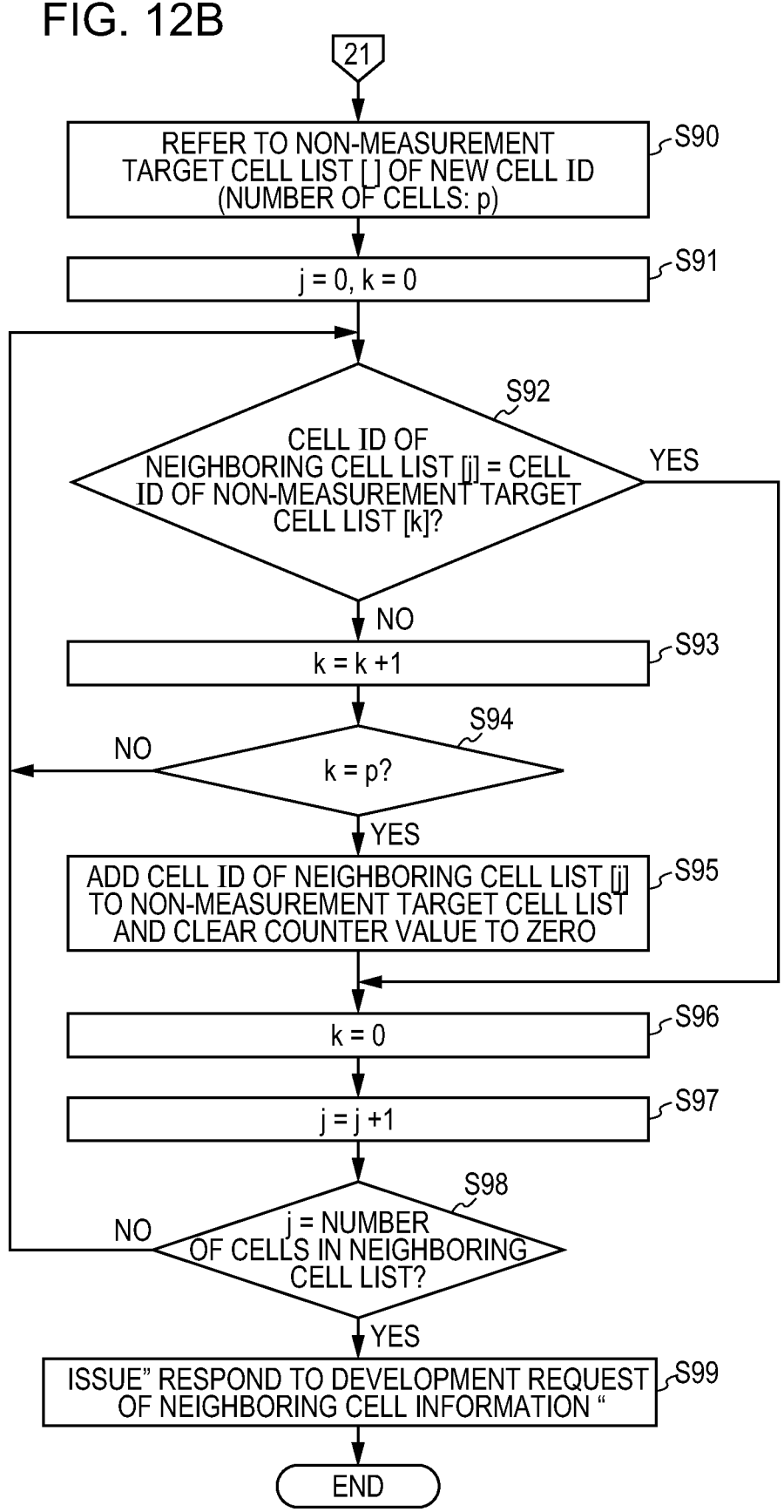
FIG. 12B is a flowchart illustrating the process for updating the non-measurement target cell list in the method of wireless communication related to the second embodiment.

FIG. 12A is a flowchart illustrating a process for updating a non-measurement target cell list in the method of wireless communication related to the second embodiment. FIG. 12B illustrates a sequence continued from FIG. 12A. The updating process of the non-measurement target cell list may include a process to clear the count of not being selected as a transition destination cell (i.e., the counter value) of the new own station cell in the non-measurement target cell list related to the previous own station cell, and then a process to increment the count of not being selected as a transition destination cell (i.e., the counter value) of the cell other than the new own station cell.

That is, as illustrated in FIG. 12A, when the development request of the neighboring cell information is received, the counter managing unit 25 reads the threshold list related to a new own station cell ID (i.e., an identifier) input by the development request of the neighboring cell information from the memory 22 (step S81). The counter managing unit 25 updates the threshold list related to the new own station cell ID with the threshold (i.e., the threshold Nlow_pri and Nnon_mea) input by the development request of the neighboring cell information (step S82).

Subsequently, the counter managing unit 25 refers to the non-measurement target cell list related to the previous own station cell ID input by the development request of the neighboring cell information stored in the memory 22 (step S83). Step S82 and step S83 may be carried out in reverse order. The number of neighboring cells included in the non-measurement target cell list related to the previous own station cell ID is set to n (n: integer).

The index number i (i: integer) is initialized to, for example, zero (step S84). Step S84 may be carried out before step S83 or before step S82. Subsequently, the counter managing unit 25 compares the cell ID of each neighboring cell in the non-measurement target cell list related to the previous own station cell ID with the cell ID of the new own station cell input by the development request of the neighboring cell information (step S85).

In accordance with the comparison result, regarding a neighboring cell which corresponds to the new own station cell (step S85: Yes) among the neighboring cells in the non-measurement target cell list related to the previous own station cell ID, the counter managing unit 25 clears the count of not being selected as a transition destination cell (i.e., the counter value) of that neighboring cell to zero in the non-measurement target cell list (step S86). Regarding a neighboring cell which does not correspond to the new own station cell among the neighboring cells in the non-measurement target cell list related to the previous own station cell ID (step S85: No), the counter managing unit 25 increments the count of not being selected as a transition destination cell (i.e., the counter value) of the neighboring cell in the non-measurement target cell list (step S87).

Then the index number i is incremented (step S88) and the cell next to the neighboring cell in the non-measurement target cell list related to the previous own station cell ID turns to be a processing target. Steps S85 to S89 are repeated until the index number i becomes equal to the number n of the neighboring cells included in the non-measurement target cell list related to the previous own station cell ID (step S89: No).

When the index number i becomes equal to the number n of the neighboring cells included in the non-measurement target cell list related to the previous own station cell ID (step S89: Yes), comparison of all the neighboring cells in the non-measurement target cell list related to the previous own station cell ID with the new own station cell input by the development request of the neighboring cell information has been completed. Subsequently, a process to reflect the unregistered neighboring cell developed by the system information to the non-measurement target cell list related to the new own station cell may be carried out.

That is, as illustrated in FIG. 12B, the counter managing unit 25 refers to the non-measurement target cell list related to the new own station cell ID input by the development request of the neighboring cell information stored in the memory 22 (step S90). The number of neighboring cells included in the non-measurement target cell list related to the new own station cell ID is set to p (p: integer).

The index number j (j: integer) is initialized to, for example, zero and the index number k (k: integer) is initialized to, for example, zero (step S91). Subsequently, the counter managing unit 25 compares the cell ID of each neighboring cell in the neighboring cell list input by the development request of the neighboring cell information with the cell ID in the non-measurement target cell list related to the new own station cell (step S92).

In accordance with the comparison result, of the neighboring cell in the neighboring cell list input by the development request of the neighboring cell information does not correspond to the neighboring cell in the non-measurement target cell list related to the new own station cell (step S92: No), the index number k is incremented (step S93). Then, the comparison target of the neighboring cell in the neighboring cell list input by the development request of the neighboring cell information turns to the next neighboring cell in the non-measurement target cell list related to the new own station cell.

Steps S92 to S94 are repeated until the index number k becomes equal to the number p of the neighboring cells included in the non-measurement target cell list related to the new own station cell ID (step S94: No). When the index number k becomes equal to the number p of the neighboring cells included in the non-measurement target cell list related to the new own station cell ID (step S94: Yes), all the neighboring cells in the non-measurement target cell list related to the new own station cell have become the comparison targets.

Therefore, the counter managing unit 25 adds the cell ID of the neighboring cell for which comparison of the neighboring cell in the neighboring cell list input by the development request of the neighboring cell information has been completed to the non-measurement target cell list related to the new own station cell. The counter managing unit 25 then clears the count of not being selected as a transition destination cell (i.e., the counter value) of the neighboring cell added to the non-measurement target cell list to, for example, zero (step S95). Of the neighboring cell in the neighboring cell list input by the development request of the neighboring cell information corresponds to the neighboring cell in the non-measurement target cell list related to the new own station cell (step S92: Yes), steps S93 to S95 are skipped.

Subsequently, the index number k is initialized to, for example, zero (step S96). Then, the comparison target of the neighboring cell in the neighboring cell list input by the development request of the neighboring cell information turns to the neighboring cell of the first place in the non-measurement target cell list related to the new own station cell. The index number j is incremented (step S97). Then, the next neighboring cell in the neighboring cell list input by the development request of the neighboring cell information is to be compared with the non-measurement target cell list related to the new own station cell.

Steps S92 to S98 are repeated until the index number j becomes equal to the number of neighboring cells included in the neighboring cell list input by the development request of the neighboring cell information (step S98: No). When the index number j becomes equal to the number of neighboring cells included in the neighboring cell list input by the development request of the neighboring cell information (step S98: Yes), comparison of all the neighboring cells in the neighboring cell list input by the development request of the neighboring cell information with the non-measurement target cell list related to the new own station cell has been completed.

Therefore, the counter managing unit 25 issues a response to the development request of the neighboring cell information (step S99), and completes the series of process steps.

Determination Process of Non-Measurement Target Cell

Figure 13:
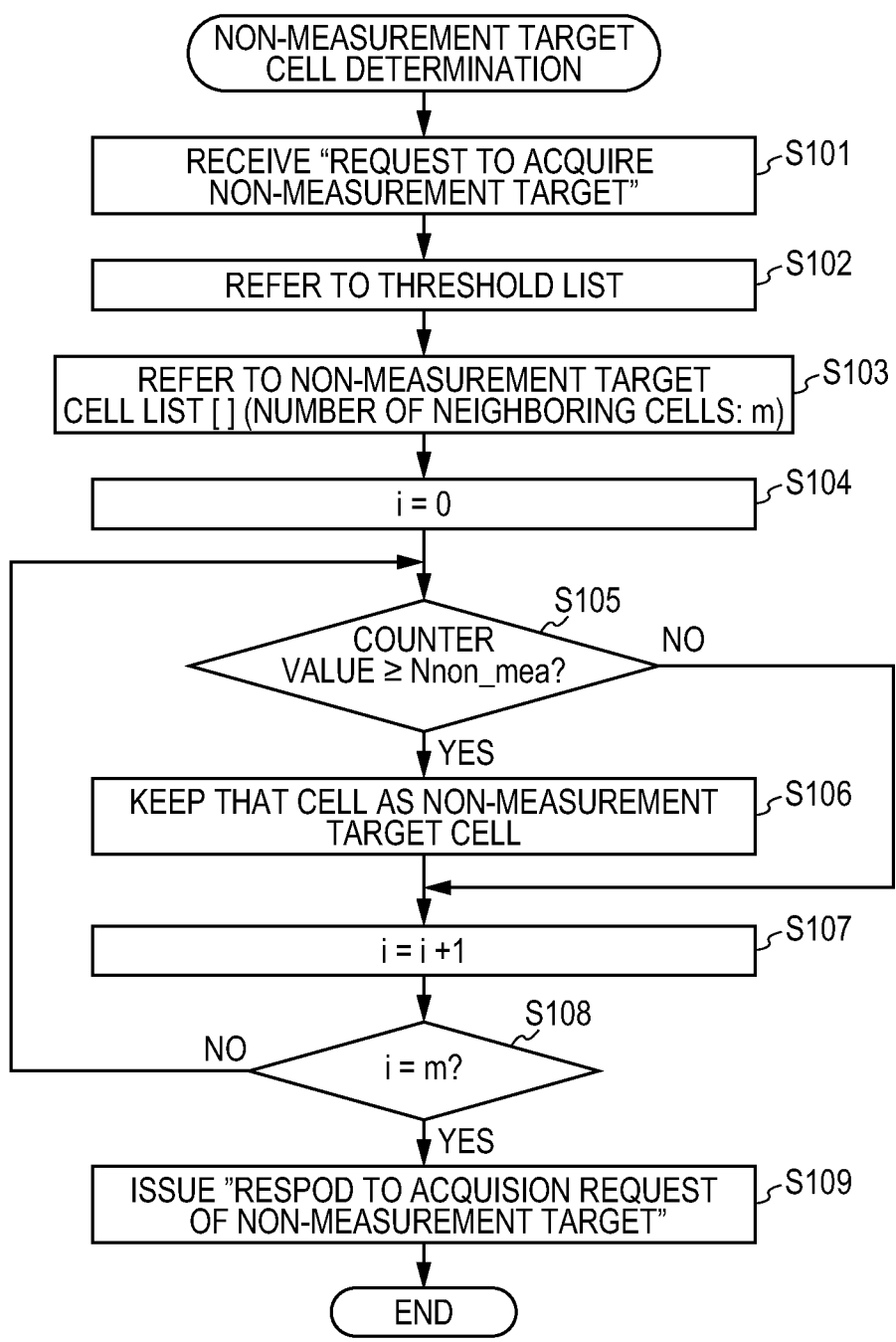
FIG. 13 is a flowchart illustrating a process for determining a non-measurement target cell in the method of wireless communication related to the second embodiment.

FIG. 13 is a flowchart illustrating a process for determining a non-measurement target cell in the method of wireless communication related to the second embodiment In the determination process of the non-measurement target cell, as illustrated in FIG. 13, when the acquisition request of the non-measurement target cell list is received (step S101), the non-measurement target managing unit 24 refers to the threshold list stored in the memory 22 (step S102) and reads the threshold Nnon_mea.

The non-measurement target managing unit 24 uses the own station cell input in the acquisition request of the non-measurement target cell list as a key, and refers to the non-measurement target cell list related to the own station cell stored in the memory 22 (step S103). Step S102 and step S103 may be carried out in reverse order. Suppose that the number of neighboring cells included in the non-measurement target cell list is m (m: integer).

The index number i (i: integer) is initialized to, for example, zero (step S104). Step S104 may be carried out before step S103 or before step S102. Subsequently, the non-measurement target managing unit 24 compares the count of not being selected as a transition destination cell (i.e., the counter value) regarding each neighboring cell in the non-measurement target cell list with the threshold Nnon_mea (step S105).

In accordance with the comparison result, regarding the neighboring cell of which counter value is equal to or greater than the threshold Nnon_mea (step S105: Yes), the non-measurement target managing unit 24 keeps that neighboring cell as a non-measurement target cell in the wireless communication state (step S106). Regarding the neighboring cell of which counter value is smaller than the threshold Nnon_mea (Step S105: No), step S106 is skipped.

The index number i is incremented (step S107) and the next neighboring cell in the non-measurement target cell list becomes a process target. Steps S105 to S108 are repeated until the index number i becomes equal to the number of the neighboring cells m included in the non-measurement target cell list (step S108: No).

When the index number i becomes equal to the number of the neighboring cells m included in the non-measurement target cell list (step S108: Yes), comparison of the count of not being selected as a transition destination cell (i.e., the counter value) regarding all the neighboring cells in the non-measurement target cell list with the threshold Nnon_mea has been completed. Therefore, the non-measurement target managing unit 24 sets the information about all the non-measurement target cells kept in step S106 to the response to the acquisition request of the non-measurement target cell list. The non-measurement target managing unit 24 then issues a response to the acquisition request of the non-measurement target cell list (step S109), and completes the series of process steps.

According to the second embodiment, the same effect as that of the first embodiment is obtained. Since the list of transition destinations of the cell is optimized for each user of the wireless communication terminal 11, ineffectual cell selection and cell reselection may be avoided. Since the number of cells of which wireless communication state is to be measured is reduced for each user, a sorting process in the management of the rank of the cell which is a transition destination candidate cell is facilitated and time for the sorting process is shortened. Thus, time until the transition destination cell is determined is shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A wireless communication system, comprising:
a transmitter to transmit a neighbor cell list including information identifying neighboring cells neighboring to a first cell in which a wireless communication terminal exists;
a receiver to receive the neighboring cell list;
a first managing unit to manage a counter that stores, for each of the neighboring cells indicated by the received neighbor cell list, a count indicating a number of times the each neighboring is not selected as a transition destination cell of the wireless communication terminal, the transition destination cell being cell to which a handover of the wireless communication terminal is to be performed from the first cell; and a second managing unit to assign a rank to each of the neighboring cells as a candidate for the transition destination cell, based on the count of each of the neighboring cells, wherein the second managing unit selects the transition destination cell, from among the neighboring cells, based on the ranks assigned to the neighboring cells.

2. The wireless communication system according to claim 1, wherein the transmitter transmits first threshold information, the receiver receives the first threshold information and the second managing unit excludes a cell with the count exceeding the first threshold from the transition destination candidate cells.

3. The wireless communication system according to claim 1, wherein the transmitter transmits second threshold information, the receiver receives the second threshold information and the second managing unit lowers priority of the transition destination candidate cells with the count exceeding the second threshold.

4. A wireless communication terminal, comprising:

a receiver to receive a neighbor cell list including information identifying neighboring cells neighboring to a first cell in which a wireless communication terminal exists;

a first managing unit to manage a counter that stores, for each of the neighboring cells indicated by the received neighbor cell list, a count indicating a number of times the each neighboring cell is not selected as a transition destination cell of the wireless communication terminal, the transition destination cell being a cell to which a handover of the wireless communication terminal is to be performed from the first cell; and a second managing unit to assign a rank to each of the neighboring cells as a candidate for the transition destination cell in accordance with the count of each of the neighboring cells, wherein the second managing unit selects the transition destination cell, from the neighboring cells, in accordance with the ranks assigned to the neighboring cells.

5. The wireless communication terminal according to claim 4, wherein the receiver receives first threshold information and the second managing unit excludes a cell with the count exceeding the first threshold from the transition destination candidate cells.

6. The wireless communication terminal according to claim 4, wherein the receiver receives second threshold information and the second managing unit lowers priority of the transition destination candidate cells with the count exceeding the second threshold.

7. The wireless communication terminal according to claim 4, wherein the first managing unit increases the count of a cell which has not been selected as the transition destination cell.

8. The wireless communication terminal according to claim 4, wherein the first managing unit restores the count of a cell selected as the transition destination cell to an initial value.

9. A method of wireless communication, comprising:

receiving a neighboring cell list including information identifying neighboring cells neighboring to a first cell in which a wireless communication terminal exists;

managing a counter that stores, for each of the neighboring cells indicated by the received neighbor cell list, a count indicating a number of times the each neighboring cell is not selected as a transition destination cell of the wireless communication terminal, the transition destination cell being a cell to which a handover of the wireless communication terminal is to be performed from the first cell;

assigning a rank to each of the neighboring cells as a candidate for the transition destination cell, based on the count of each of the neighboring cells; and selecting the transition destination cell, from among the neighboring cells based on the ranks assigned to the neighboring cells.

10. The method of wireless communication according to claim 9, wherein a cell with the count exceeding a first threshold is excluded from the transition destination candidate cells.

11. The method of wireless communication according to claim 9, wherein a cell with the count exceeding a second threshold is lowered in priority as the transition destination candidate cell.

12. The method of wireless communication according to claim 9, wherein the count of a cell which has not been selected as the transition destination cell is increased.

13. The method of wireless communication according to claim 9, wherein the count of a cell selected as the transition destination cell is restored to an initial value.

* * * * *